Patented Aug. 27, 1935

2,012,930

UNITED STATES PATENT OFFICE 2,012,930

ANTHRAQUINONE VAT DYESTUFFS

Raymond Joseph Sobatzki, South Milwaukee, Wis., and Oakley Maurice Bishop, deceased, late of Wilmington, Del., by Eva P. Bishop and Wilmington Trust Co., executors, Wilmington, Del., assignors to E. I. du Pont de Nemours & Company, Wilmington, Del., a corporation of Delaware No Drawing. Application May 9, 1934, Serial No. 724,820

4 Claims. (Cl. 260—44)

This invention relates to the preparation of new and valuable dyestuffs of the anthraquinone series and more particularly to the preparation of p'-acidylamino-beta-phenyl-anthraquinone of the general formula:

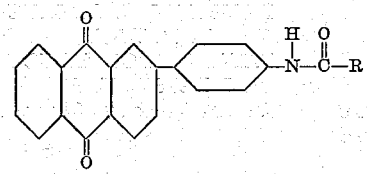

wherein the R represents an aromatic radical and in which the anthraquinone radical may contain simple monovalent substituents.

The inventors have found that p-amino-beta-phenyl-anthraquinone can be condensed with acid chlorides of the aromatic series to form new products which dye fibers in bright shades ranging from greenish-yellow to orange of good fastness to light, washing and bleach.

The procedure used for effecting these condensations is in general the same as usually used in the preparation of aroyl-amino-anthraquinone compounds by condensing amines with acid chlorides, which may be illustrated by the following examples.

Example 1

10 parts of p'-amino-beta-phenyl-anthraquinone are suspended together with 10 parts of 1,9-anthraisothiazol-2-carbonyl chloride in 300 parts of nitrobenzene. The mixture is heated to 140–145° for 30 minutes, then cooled to 40° and filtered, washed and dried. The resulting condensation product is a greenish-yellow powder and dyes cotton from a violet-blue to blue vat in greenish-yellow shades of good fastness. The product has the following probable formula:

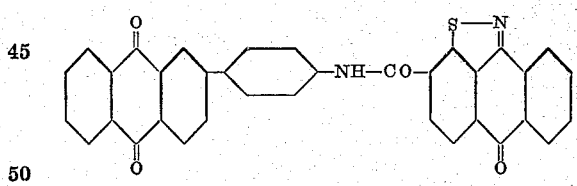

Example 2

10 parts of p'-amino-beta-phenyl-anthraquinone are suspended in 250 parts of nitrobenzene and 11.5 parts of 1,9-anthraisoselenazol-2-carbonyl chloride are added. The temperature is raised to 140° and maintained for 1 hour. After cooling, the dyestuff is isolated by filtration and washed. It is a yellow powder dyeing cotton in yellow shades.

Example 3

10 parts of p'-amino-beta-phenyl-anthraquinone are dissolved in 150 parts of trichlorbenzene at 130° and a solution of 10 parts of 1,9-thiophenoanthrone-2-carbonyl chloride in 150 parts of trichlorbenzene is added. The temperature is raised to 145–150° and maintained for ½ hour. After cooling, the dyestuff is filtered and washed. It dyes cotton from a reddish-brown vat in golden yellow shades, and has the probable formula:

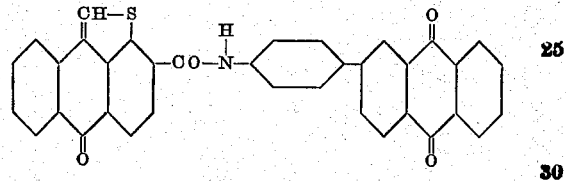

Example 4

12 parts of p'-amino-beta-phenyl-anthraquinone and 12.8 parts of 1-nitro-anthraquinone-6-carbonyl chloride are heated in 300 parts of nitrobenzene to 140–150° for 2 hours. The mass is cooled to 50° and filtered, washed and dried.

The resulting nitro compound is suspended in 1000 parts of alcohol and 500 parts of water and reduced with 75 parts of sodium sulfide at the boil. During the course of the reduction the alcohol is evaporated (2–3 hours) and the red amino compound filtered hot, washed and dried.

It may be benzolated as follows: 20 parts of amino compound are heated with 250 parts of nitrobenzene and 15 parts of benzoyl chloride to 150–160° for 1 hour. The yellow crystalline product is filtered at 50°, washed with alcohol and dried. It dissolves in concentrated sulfuric acid with yellow color and dyes cotton in yellow shades from a red brown vat. The product has the following probable formula:

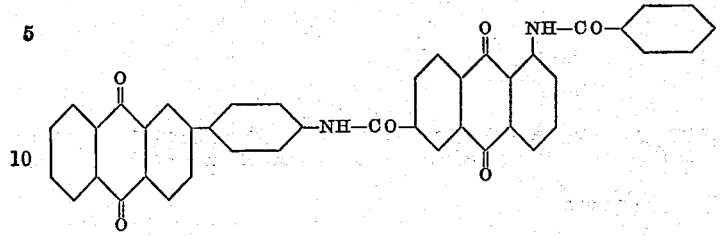

Example 5

10 parts of p-amino-beta-phenyl-anthraquinone and 150 parts of nitrobenzene are heated to 150–160° and 5.2 parts of benzoyl chloride are added over a period of 15–30 minutes. The reaction mixture is cooled to 30–40° and filtered. The product, on drying, is a bright yellow powder dyeing cotton a yellow shade from a brown vat.

Any of the methods known in the art for condensing arylamino compounds with aroyl chlorides may be used in place of those specifically described in the examples, which are given merely to illustrate and not to limit the invention. Various solvents may be used in place of nitrobenzene or trichlorobenzene and the temperatures may be varied widely.

Other acid chlorides than those mentioned in the examples may be employed in the production of dyestuffs of this series, such as beta-naphthoyl chloride, the Bz-substitution products of benzoyl chloride, anthraquinone acid chlorides substituted or unsubstituted, acid chlorides of heterocyclic aromatic compounds such as thiophene acid chloride, pyridine acid chloride, picolinic acid chloride, quinoline acid chloride, etc. By the term "aroyl" as it is used in the claims it is meant to include aromatic compounds which may be either isocyclic or heterocyclic.

What we claim is:
1. A 4'-aroylamino-2-phenyl-anthraquinone.
2. A 4'-benzoylamino-2-phenyl-anthraquinone.
3. A compound of the general formula:

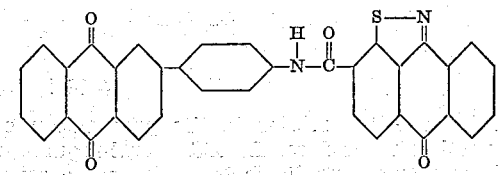

4. The process which comprises condensing a 4'-amino-2-phenyl-anthraquinone with an aroyl halide.

RAYMOND J. SOBATZKI.
EVA P. BISHOP,
WILMINGTON TRUST CO.,
By W. J. LAIRD, V. P.,
*Executors of the Estate of Oakley Maurice Bishop, Deceased.*